United States Patent
Ashley (10) Patent No.: US 11,043,023 B2
(45) Date of Patent: Jun. 22, 2021

(54) SURROUND MONITORING SYSTEM FOR VEHICLES

(71) Applicant: DENSO CORPORATION, Kariya (JP)

(72) Inventor: Jonathan David Ashley, Coventry (GB)

(73) Assignee: DENSO CORPORATION, Kariya (JP)

( * ) Notice: Subject to any disclaimer, the term of this patent is extended or adjusted under 35 U.S.C. 154(b) by 18 days.

(21) Appl. No.: 16/407,597

(22) Filed: May 9, 2019

(65) Prior Publication Data

US 2019/0355171 A1 Nov. 21, 2019

(30) Foreign Application Priority Data

May 17, 2018 (GB) ..................................... 1808052

(51) Int. Cl.
| G06T 15/20 | (2011.01) |
| B60W 30/06 | (2006.01) |
| B60W 50/00 | (2006.01) |

(52) U.S. Cl.
CPC ........... G06T 15/205 (2013.01); B60W 30/06 (2013.01); *B60R 2300/105* (2013.01); *B60R 2300/607* (2013.01); *B60R 2300/806* (2013.01); *B60W 2050/0089* (2013.01); *G06T 2207/30264* (2013.01)

(58) Field of Classification Search
CPC ................ G06T 15/205; B60W 30/06; B60W 2050/0089; B60R 2300/607; B60R 2300/806; B60R 2300/105
See application file for complete search history.

(56) References Cited

U.S. PATENT DOCUMENTS

| 2013/0033602 A1 | 2/2013 | Quast et al. |
| 2014/0125774 A1 | 5/2014 | Lee et al. |
| 2014/0347450 A1 | 11/2014 | Han et al. |
| 2014/0368655 A1 | 12/2014 | Schlittenbauer et al. |
| 2015/0243069 A1 | 8/2015 | Knoblauch et al. |
| 2016/0297364 A1* | 10/2016 | Kitaura ................. G06T 3/0056 |
| 2018/0040103 A1 | 2/2018 | Esparza Garcia et al. |

(Continued)

FOREIGN PATENT DOCUMENTS

| CN | 107176101 A | 9/2017 |
| JP | 2001-224013 A | 8/2001 |

(Continued)

OTHER PUBLICATIONS

Chen, Yi-Fu, "A Bird-View Surrounding Monitor System for Parking Assistance," Master Thesis—Institute of Compute Science and Information Engineering, National Ventral University, Chungli, Taiwan. Jun. 27, 2008, pp. 1-73 (Chinese Summary: pp. 1-12, English Thesis: pp. 14-73).

*Primary Examiner* — Ruiping Li
(74) *Attorney, Agent, or Firm* — Maschoff Brennan (57) ABSTRACT

A surround view system for a vehicle includes: a three-dimensional geometry unit configured to receive vehicle surrounding environment data and generate a three-dimensional model of a vehicle surrounding environment based on the received vehicle surrounding environment data; and a view generation unit configured to receive visual data and map the visual data to portions of the three-dimensional model based on the spatial and/or temporal information of the visual data and the vehicle surrounding environment data to form a virtual surround view.

26 Claims, 6 Drawing Sheets

(56) References Cited

U.S. PATENT DOCUMENTS

2018/0176533 A1    6/2018  Friebe et al.
2018/0246515 A1*   8/2018  Iwama ................. G05D 1/0246

FOREIGN PATENT DOCUMENTS

| JP | 2005-44224 A | 2/2005 |
| JP | 2007-314129 A | 12/2007 |
| JP | 2016-212501 A | 12/2016 |
| WO | 2016/198059 A1 | 12/2016 |

* cited by examiner

SURROUND MONITORING SYSTEM FOR VEHICLES

CROSS REFERENCE TO RELATED APPLICATION

The application claims the benefit of priority from United Kingdom Patent Application No. 1808052.3 filed on May 17, 2018. The entire disclosures of the above application are incorporated herein by reference.

TECHNICAL FIELD

The present disclosure relates to surround monitoring system and in particular but not exclusively to surround monitoring system for vehicles.

BACKGROUND

Surround monitoring systems are provided to assist a driver of a vehicle by displaying a view of the vehicle and its surroundings, for example when parking or the vehicle is autonomously driven. A surround monitoring system includes at least one camera for obtaining images or videos of the surrounding environment and a display for displaying a view generated based on the obtained images or videos. A bird's-eye view or a top view which provides a 360 degree surround view may be useful as it provides information to the user that would otherwise not be available, for example the whole vehicle's positioning in relation to its surroundings.

SUMMARY

The present disclosure may provide a surround view system for a vehicle includes: a three-dimensional geometry unit configured to receive vehicle surrounding environment data and generate a three-dimensional model of a vehicle surrounding environment; and a view generation unit configured to receive visual data and map the visual data to portions of the three-dimensional model.

Furthermore, the present disclosure may provide a vehicle including the surround view system, a method of generating a surround view for a vehicle, and a computer program product.

BRIEF DESCRIPTION OF DRAWINGS

Embodiments of the present teachings will be described hereinafter, by way of example only, with reference to the accompanying drawings in which like reference signs relate to like elements and in which.

While the present teachings are susceptible to various modifications and alternative forms, specific embodiments are shown by way of example in the drawings and are herein described in detail. It should be understood, however, that drawings and detailed description thereto are not intended to limit the scope to the particular form disclosed.

DETAILED DESCRIPTION

The inventors of the present disclosure have found the followings.

In providing various views, in particular bird's-eye views, surround monitoring systems introduce a significant amount of distortion into the virtual views. Such distortions may occur due to views being formed by projecting images over a surface (e.g. a bowl-shaped surface surrounding a representation of the vehicle) which results in some portions of the images being stretched or compressed in a manner that does not reflect reality.

The present disclosure may provide a surround monitoring system which generates a more informative surround view with reduced distortion in an efficient manner.

According to one aspect of the present disclosure, a surround view system for a vehicle may include a three-dimensional geometry unit configured to receive vehicle surrounding environment data and generate a three-dimensional (3D) model of a vehicle surrounding environment based on the received vehicle surrounding environment data, and a view generation unit configured to receive visual data and map the visual data to portions of the three-dimensional model based on the spatial and/or temporal information of the visual data and the vehicle surrounding environment data to form a virtual surround view.

The present disclosure may generate a 3D model of objects (for example, but not limited to, other vehicles, building structures or pedestrians) in surrounding environment of the vehicle, where visual data such as images and/or video are attached to portions of the 3D model based on temporal and/or spatial data of the visual data and the vehicle surrounding environment data. The view generation unit may comprise a graphics processing unit (GPU). The 3D model of objects within a working range may be converted into different formats when being dealt with by the three-dimensional geometry unit and by the view generation unit.

The vehicle surrounding environment data may include at least one of sensor data (for example radar data, LIDAR data, camera data, laser scan data, ego motion data, vehicle movement data), and information from external sources. Spatial data may include at least one of camera positions (for example X, Y, Z orientations defining tilt, pitch and yaw) and Field of View (for example horizontal field of view and vertical field of view).

As the visual data are mapped onto the 3D model of the surrounding environment by comparing the temporal and/or spatial data of the visual data and the vehicle surrounding environment data, the surround view system is able to use visual data and vehicle surrounding environment data from various sources that are internal or external to the vehicle.

Generating a 3D model enables each object identified in the surrounding environment of the vehicle to have its own internal resolution. Thereby, lower data sets are required than if, for example, a 3D grid is used to define the surrounding, which requires a high number of data sets. Thus, a more efficient system can be provided.

At least one 3D model of an object within a working range may have a substantially cuboid shape where the upper portion of the cuboid is configured to reflect the shape of an upper portion of the object that is being modelled. Thus, an intermediate shape between a detailed 3D model and a simple cuboid is provided. Thereby, an object having sufficient detail for recognition of the object by shape is provided using less data than if a textured 3D model is formed.

Further, forming a 3D model and then mapping the visual data onto the 3D model significantly reduces any distortion in the virtual surround view generated.

In some examples, the system may comprise a wireless communication unit for implementing vehicle-to-everything communication. Thereby visual data and vehicle surrounding environment data may be received from external sources and/or internal sources such as local sensors and/or cameras of the vehicle. This enables providing more diverse and extreme virtual surround views, as the system not only relies on the vehicle's own local source of data, but uses data from external sources. The environmental data received from external sources may include at least one of vehicle data from other vehicles and 3D model information relating to an object in the surrounding environment of the vehicle. Such vehicle data may include at least one of the vehicle size, position, orientation, and 3D model information may be in standard interchangeable formats comprising data relating to structural sizes, configuration, or vehicle exterior model.

In some examples, the vehicle surrounding environment data may comprise data relating to an object within a predetermined range from the vehicle, the data comprising at least one of: positional data of the object, texture of the object; and ego-motion data of the vehicle. Thereby, relevant data can be received by the system.

In some examples, the view generation unit may be configured to map the image by projecting texture detected in the visual data. Thereby, a more detailed virtual surround view can be provided. This can be particularly useful where the virtual surround view is zoomed in on a particular area.

In some examples, the system may further comprise a data storage unit for storing historical data including at least one of previously used: three-dimensional motion data, three-dimensional model and visual data. Thereby, a more efficient system can be provided by re-using any data that are re-usable. Further, historical data may be used to provide data for portions where fresh data are missing, for example to re-render missing image/video areas.

In some examples, the system may further comprise a display unit configured to display the virtual surround view image.

In some examples, the system may further comprise a user interface for adjusting the view point of the virtual surround view displayed on the display unit. When the viewing point of the virtual surround view may be adjusted by the user and the corresponding virtual surround view of the 3D model with the visual data attached to it may be presented to the user.

In some examples, the three-dimensional geometry unit and the view generation unit may respectively be configured to receive vehicle surrounding environment data and visual data relating to objects within a predetermined range.

In some examples, an increased range may be applied if no vehicle surrounding environment data can be obtained in the predetermined range.

In some examples, the view generation unit may be configured to select historical visual data based on the perspective.

In some examples, the view generation unit may be configured to adjust the colourisation of areas of the virtual surround view image based on the temporal data of the visual data mapped onto the area.

According to another aspect of the present disclosure, there can be provided a vehicle including a surround view system according to any combination of the above disclosures.

According to another aspect of the present disclosure, there can be provided a method of generating a surround view for a vehicle, the method including: receiving vehicle surrounding environment data; generating a three-dimensional model of a vehicle surrounding environment based on the received vehicle surrounding environment data; receiving visual data; and mapping the visual data to portions of the three-dimensional model based on the spatial and/or temporal information of the visual data and the vehicle surrounding environment data to form a virtual surround view.

The method may repeat the above steps to track objects in the environment surrounding the vehicle and form an updated virtual surround view.

The method may comprise a further step of at least one of: assembling, modifying and destroying; at least a portion of the three-dimensional model based on additional vehicle surrounding environment data received. Assembling and destroying may occur particularly when the vehicle moves such that the predetermined range of area changes. For example, new portions of three-dimensional model may be formed based on data relating to new surrounding environment in the current range (i.e. the area within the range at the time when the three-dimensional model is being built). As another example, some of the old portions of the three-dimensional model may be destroyed when said old portions of the three-dimensional model is no longer in the current range. As yet another example, portions of the three-dimensional model may be modified to reflect any changes in the vehicle surrounding environment data received, even if the vehicle does not move and thus the range area remains the same.

The method may comprise a further step of storing used data in a data storage as historical data for later use. The historical data may be ordered based on priority. For example, such historical data may be ordered, more frequently used historical data having higher priority. If the historical data is obtained very far from the current range (which defines a range of area, where data relating to the objects within this range are received), such historical data may also be deleted.

According to another aspect of the present disclosure, there can be provided a computer program product comprising processor-executable instructions for causing a programmable computer to perform the method described above in accordance with any combination of the above clauses relating to the method.

According to the present disclosure, it may be possible to achieve at least the following advantages: reduced distortion in view of the 3D model; more diverse and extreme virtual views based on data from external sources; flexible use of data from various sources by separation of surround environment data and visual data (in other words spatial measurement by sensors are considered separate from any pixels of images or videos captured by 2D camera views); and higher quality virtual views by using data from both internal and external sources, which in turn means that high quality local sensors and cameras are not required.

EMBODIMENTS

Embodiments and examples are described hereafter by way of example only in the following with reference to the accompanying drawings.

The present teachings present a number of approaches for minimising distortion in surround views.

Figure 1:
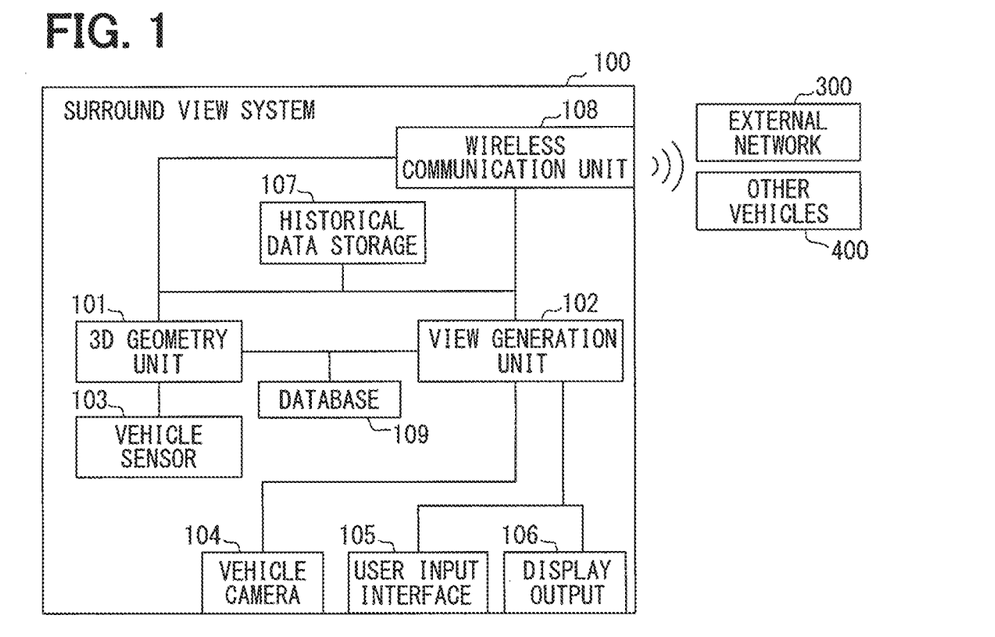
FIG. 1 is a block diagram of elements of a surround view system.

FIG. 1 is a block diagram illustrating the main elements of a surround view system 100 according to one embodiment.

As can be seen the surround view system 100 comprises a three-dimensional (3D) geometry unit 101 which is configured to receive vehicle surrounding environment data relating to objects within a predetermined range from the vehicle to form a 3D model of a scene surrounding the vehicle. Such vehicle environment data can be received from various different sources, for example the vehicle sensor 103, historical data storage 107 and wireless communication unit 108.

The surround view system further comprises a view generation unit 102 which is configured to receive visual data relating to objects within a predetermined range from the vehicle and to map the received visual data to the 3D model generated by the 3D geometry unit 101. The visual data can be received from various different sources, for example the vehicle camera 104, historical data storage 107 and the wireless communication unit 108.

Vehicle sensor 103 which is locally mounted on the vehicle to access surrounding environmental information external to the vehicle may be any one or combination of simple ultra-sonic sensors, complex phased array sensors, depth recognition algorithms, laser scanners, 3D time of flight sensors or in future possible digital holographic 3D sensing technology.

Vehicle camera 104, which is also locally mounted on the vehicle with access to view external to the vehicle may be any one or combination of 180° surround cameras, 60° camera mirror cameras, front bumper, rear or side cameras.

Wireless communication unit 108 is used to provide data from sources external to the vehicle. For example, the wireless communication unit 108 may be configured to implement vehicle-to-everything communication, including vehicle-to-vehicle communication with other vehicles 400. The wireless communication unit 108 may also be used to access other data from external network 300. Accordingly, sensor or geometry data from other vehicles or structures may be received via the wireless communication unit. In some examples, a pre-formed 3D model of the surrounding environment may be used. Such pre-formed 3D model may be received by the 3D geometry unit 101 to be further updated with the data received from the vehicle sensor 103, for example to update any pedestrians passing by or nearby vehicles.

Where pre-formed 3D models are received, these may be in standard interchangeable formats that the V2X infrastructure is configured to use to disseminate the information relating to the 3D models, for example car park bay sizes and layout. The external vehicles that have the capability to implement V2V (vehicle to vehicle communication) may also share their known exterior models by sharing a link to a shape ID database of these attributes. Such vehicle shape IDs and subsequent models may be downloaded and cached in the data storage by the driven vehicle to re-use.

The historical data storage 107 is configured to store various data that have been previously used by the 3D geometry unit 101 or the view generation unit 102. For example, such previously used data may include any 3D model that have been used before or 3D model that were generated by the 3D geometry unit 101, or previously used images.

In another embodiment, the historical data storage 107 and the 3D geometry unit 101 may further be configured to receive historical 3D motion data. 3D motion data are collected using ego motion data of the vehicle and by maintaining the history of the movement of known 3D geometry and images that were captured particularly during autonomous driving (when surround view system is most likely to be and most often used). Ego motion data of the vehicle are collected by ego motion sensors on the vehicle, such as wheel distance pulses, steering wheel input, gyroscope and accelerometers. Thus, these sensors (and other cameras and sensors mentioned above) that may be provided in the existing vehicle system may form a part of the surround view system once the surround view system is installed onto the vehicle. The motion of the external objects are detected by object tracking algorithms and historical movement data are maintained whilst the objects transition into current range (range area), which is the known working area for which the 3D model is generated. The 3D motion data are used to update the positioning and orientation of the objects in the 3D model, which represent the external objects in the surrounding environment of the vehicle, within the current range area. In other words, the relative positions and orientations are updated as the driven vehicle (the vehicle comprising the surround view system) moves.

The view generation unit 102 is connected to the display output 106 where the view generated is displayed to the user, such as the driver or passenger of the vehicle). The view generation unit 102 is further connected to a user input interface 105, via which the user is able to adjust the perspective view which is displayed on the displayed output 106. The display output 106 may be configured to display the virtual surround image produced by the view generation unit 102 with the measured pitch and roll of the vehicle also being indicated. For example, such pitch and roll information may be displayed on the part of the virtual surround image that corresponds to the floor upon which the vehicle is situated.

Figure 2:
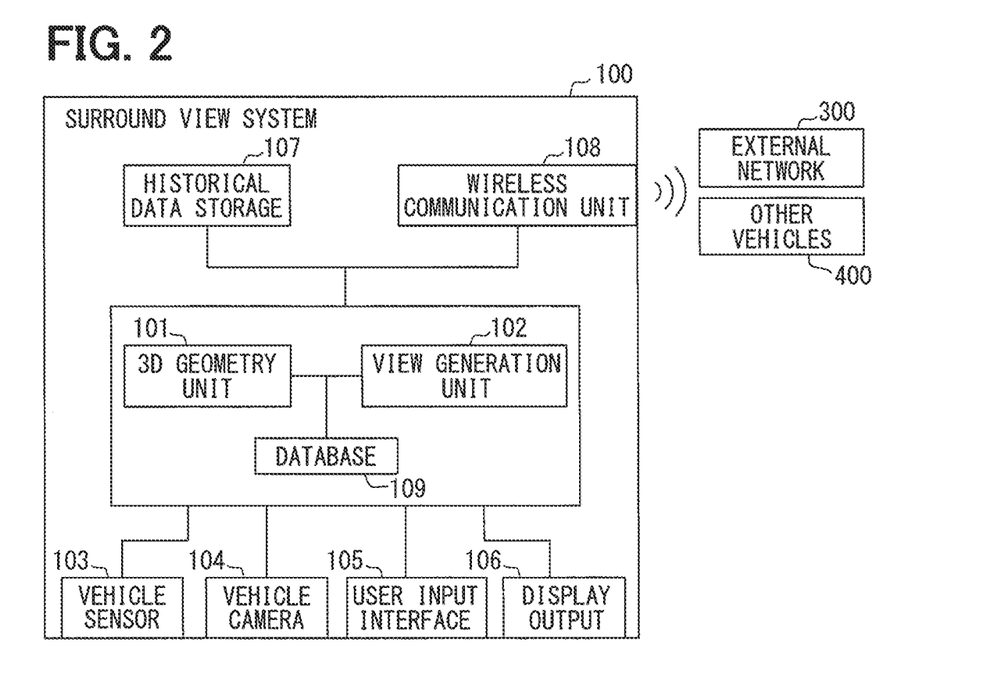
FIG. 2 is a block diagram of elements of a surround view system according to another embodiment.

In other embodiments, the user input interface may also be directly connected to the 3D geometry unit 101. Although the 3D geometry unit 101 and the view generation unit 102 are described in this embodiment as two separate units, in some embodiments these units may be more integrated, as in the embodiment illustrated in FIG. 2.

The limit of the surround view generated by the surround view system 100 is determined by a range which is pre-defined, where the data relating to the objects within the range are obtained by the surround view system 100. For example, the range may be a radius of 10 m from a point defined as a centre of the vehicle. The range may further be defined as a predetermined shape, for example a cylinder or an upside down frustoconical shape (upside down frustum of a cone) having a predetermined radius, for example, 5 m, 10 m, 15 m or 20 m. The radius may change between a smaller and a larger value depending on whether any objects are determined or depending on the movement of the vehicle. Other shapes may also be used, for example an upside sown frustum of a pyramid or a cuboidal shape. In some examples, the range area may have rounded edges particularly in the upper edges (i.e. not the base portion).

As will be appreciated by the skilled reader, the height of the frustum of a cone or the cylinder would be determined depending on the height and/or width of the vehicle, where the height of the frustum of a cone or the cylinder are higher than the height of the vehicle such that the whole of the vehicle is placed within the frustum of a cone or the cylinder. The range may be adjusted depending on the view requested by the user, or depending on whether the data is being gathered for the 3D geometry unit 101 or the view generation unit 102. In some cases, if the surround view system 100 is unable to detect any sensor information to build a local 3D model, an auto-sizing mechanism is carried out to re-determine the size of the range. For example, the auto-sizing mechanism may continue to increase the range until a sensor data is received.

The space determined by the range and the shape has a flat floor or base extending from the underside of the vehicle. The objects within the space are tracked by the vehicle's own local sensors such as the vehicle sensor 103, or by data provided by a vehicle-to-everything communication system (V2X system), or by data communicated from other vehicles 400 or external network 300. The external network 300 may provide information on the environment of the vehicle, for example if the vehicle is in the car park, known geometry may be provided by the car park, or overhead CCTV capture facilities.

For example, the car park may already have a basic 3D model of its structure and surroundings, and the 3D geometry unit 101 can start with this basic 3D model and modify or update the 3D model with the environment data that it has received for any objects in the range of the vehicle.

As another example, data may be received by V2X system or vehicle-to-vehicle communication system (V2V). Data received from another vehicle 400 may include vehicle type code, absolute global navigation satellite system (GNSS) and orientation information. Receiving information about other vehicles in this manner enables improved final rendering by allowing the 3D geometry unit 101 to obtain a simple vertex model of the V2X or V2V capable vehicles nearby.

The data via the wireless communication unit 108 or the historical data storage 107 are used where necessary by the surround view system 100, for example where information is not available via the local sensors or cameras. This means that the vehicle does not require a large number of high quality sensors and cameras, as the surround image is generated using data from external sources. Furthermore, a more extreme angled or wider surround view is made available as information that is not obtainable via the local sensors or cameras can be obtained. For example, the local sensor or camera cannot see beyond an object immediately in front of the vehicle. However, using external sources, additional information is provided. This information can be used in assembling the virtual surround view. For example, where data is not available from the vehicle's local sensor or camera, images or videos from external sources may be blended with any live video or images from the primary local vehicle camera to add any missing visual data within the relevant area around the vehicle.

Where data from live camera feeds and historical images are being overlapped, the blending mechanism may also favour certain camera positions for the object within the view of the camera. When the historical images are accessed from the historical data storage 107, those images that are taken from an angle most perpendicular to the object (e.g. a full side view, full front view, full rear view, rather than a side view from a slight angle) are preferred over other images. For example, a full side, front or rear view is preferred over a view from an angle. The historical data storage 107 may store images in priority order depending on the perspective view of the image, where the most perpendicular images are given highest priority.

In case of using historical ego motion data or images to re-render missing image areas, colourisation of certain image areas may be introduced to differentiate between new live images/video and stale images/video. For example, the age of the stale historic images may change the blend or increase transparency. This visual differentiation provides the user with confidence level of the virtual surround view generated.

The historical data storage 107 may further be connected to various portions of the vehicle to also maintain historical 3D motion data. For example, by using ego motion of the vehicle and by keeping history of the movement of known 3D geometry, additional geometry information that are unavailable from live sensing of the local vehicle sensors may be provided.

The view generation unit 102 maps the visual data onto the 3D model generated by the 3D geometry unit 101 by attaching the visual data to the portion of the 3D model determined to be relevant based on the temporal and spatial data of the visual data. Attaching the image or video data (the visual data) may comprise positioning, blending, scaling and transposing the image or video data based on the temporal and spatial data of the visual data. The 3D geometry unit 101 continues to update the 3D model as the vehicle moves, and the 3D geometry unit 101 continues to map the visual data to the 3D model. When the vehicle is moving and a video is not available to reflect the movement of the vehicle, time stamped static images may be used instead of the video. The video or image may be realigned to fit certain areas of the virtual view.

Where no sensed geometry data are provided, the view generation unit 102 is configured to default to attaching image data to a flat floor and walls depending on the temporal and spatial data of the image data.

During mapping, the view generation unit 102 prioritises those areas in the 3D model which correspond to the portion that are being rendered to be displayed to the user. Where all the 3D objects in the 3D model have their corresponding image or video attached, a mechanism of "shadow mapping" is employed to hide the images on the objects behind other objects. Thus, when displayed to the user, the images on portions of objects that are behind other objects are hidden.

In their simplest forms, the 3D objects in the 3D model of the surrounding environment can be cuboids with rounded edges. This type of representation has the lowest resolution possible for an object, as it simply has a defined size and percentage of rounding of any viewable edges (usually the top viewable edges are rounded).

Preferably, the 3D objects in the 3D model are modelled to at least reflect the shape of an upper section of the object in real life. For example, another vehicle may be represented as a cuboid with the upper section modified to reflect the shape of the upper section of the vehicle. The lower portion may remain in the shape of the cuboid, such that, for example, wheels of the vehicle are not represented in detail in the 3D model of the vehicle. In other words, the model of the vehicle may seem as if it is formed by moulding. An example of this can be seen in FIG. 5, a 3D model of another vehicle 401. As can be seen, whilst low resolution sensors are used and the 3D model comprise simplified representation of the objects in the working range, sufficient detail of the object is provided such that the user is able to readily identify the characteristics of the objects and recognise what the objects are representing. Multiple geometrical sensors can be used in combination with ego motion of the vehicle to shape objects. Therefore, a 3D model can be created even based on data from low resolution sensors.

As the present system is not simply projecting images or videos received from local cameras, but rather attaching images or video (visual data) to portions of the 3D model generated by the 3D geometry unit 101 using spatial (for example angles or positions) and temporal information of the visual data, it is able to use and combine data from any sources.

That is to say, there is a clear separation in the sensor data (which include 3D measurements) relating to the vehicle surrounding environment data from and visual data (which include the 2D images and videos taking by 2D cameras). Thus, any 3D spatial measurements (e.g. by various sensors discussed above) can be completely separated and not connected to the pixels captured by the 2D camera views. The historical 2D images (or videos) and the camera X,Y,Z position and orientation in space allows reconstruction of the "working area" (in the range area) and fill in texture on the 3D model where information is available. Particularly when the visual data are from an external source, temporal information and historic positions and orientation so of the cameras are used to determine where on the 3D model the visual data are to be mapped.

The present system attaching images or video to portion of the 3D model based on the spatial and temporal information of the images or video also means that distortion that can be introduced by projecting can be eliminated.

Whilst the above embodiment is described as comprising the wireless communication unit 108, in some embodiments the surround view system 100 may rely on locally provided data without accessing data available from the wireless communication unit 108. In other words, the system is able to function as a stand-alone (i.e. only using the vehicle's local sensors and cameras) even if the wireless communication is not a part of the structure. Even in this case, the current method of attaching visual data to 3D model significantly removes any distortion in the virtual view for displaying to the user.

Further, whilst it is described above that the perspective view may be adjusted by the user, the perspective view may be moved by automation, for example to a certain angle and distance depending on the movement of the vehicle or the detected surrounding of the vehicle.

As discussed above, it is not necessary for any direct connection between the images/video captured and position/size of the objects in the 3D model. The only relationship between the visual data and the position/size of the objects/portions of the 3D model required is the relative camera positions (X, Y, Z orientations which are respectively tilt, pitch and yaw), field of view (HFoV, horizontal field of view, and VFoV, vertical field of view) as aligned on the driven vehicle and/or the temporal data relating to these positions and views.

These temporal and spatial data form a part of the visual data (e.g. as metadata of the visual data). Thus, where the visual data are being received from an external source, such spatial data and temporal data of the visual data and the vehicle surrounding environment data are compared and matched up to determine the portion of the 3D model to which the visual data are to be mapped onto.

Where the visual data are received from an internal source, as the local vehicle cameras move in space (attached to the vehicle) they capture images and trace a known panorama. The relative camera positions, orientations and field of view as aligned on the driven vehicle are considered, and as long as it is determined that there is no significant discrepancy in temporal terms between sensing of the surrounding environment and the image capture rates, the images should appear on regenerated surfaces of the 3D model to where they were captured.

As mentioned earlier, using a 3D model as in the present approach is advantageous over using a 3D grid. For example, a 3D grid is usually defined as having a fixed spaced or nominal resolution (in X, Y and Z axes). To define an accurate 3D grid, huge data sets are required, which increases the required processing power. Each object in the 3D model in the present approach can have its own internal resolution. Therefore, any object known to be within the surrounding area (such as other vehicles) that has its own fine vertex model can be sent straight to the GPU and positioned by floating point precision. Basic objects can be defined as cubes and simply have a specified size and position. All of the object types and resolutions can be mixed and handled by the GPU.

Receiving information about vehicle type, vehicle position and orientation is useful as it can be received as data having a relatively small size, but provides a significant amount of information, whilst saving any additional work which has to be actively carried out by the surround view system.

Figure 3:
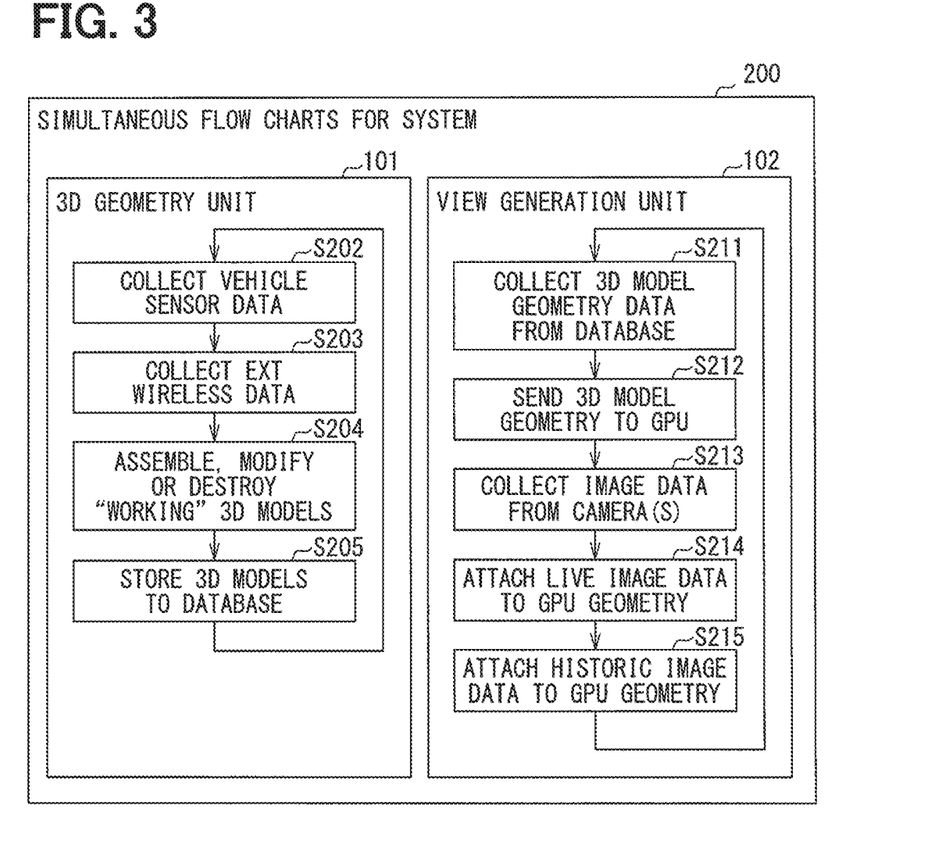
FIG. 3 is a flow chart illustrating representative steps for providing a surround view.

FIG. 3 is a flow chart 200 of the steps carried out by the surround view system 100 according to one embodiment.

More specifically, FIG. 3 illustrates the steps that the 3D geometry unit 101 and the view generation unit 102 take simultaneously. This is not to say that each step taken by the units are aligned (S202 and S211 taken at the same time), but that both the 3D geometry unit 101 and the view generation unit 102 continue to repeat the steps that each units are configured to take. In other words, the 3D model is repeatedly updated by the 3D geometry unit 101 and the visual data are repeatedly matched to the updated 3D model (or updated visual data are matched to the 3D model) at the same time.

In this embodiment, the 3D geometry unit 101 receives vehicle sensor data (vehicle surrounding environment data) from local vehicle sensors at S202. If available, any vehicle surrounding environment data from an external source is received via the wireless communication unit at S203. Using the vehicle surrounding environment data collected, a working 3D model is formed. Initially, a 3D model is assembled. This assembling occurs when the process is first initiated, or when the vehicle moves and the range area (working area) also moves which may result in new objects being introduced into the new working area. At the same time, the part of the 3D model which is no longer in the working area may be destroyed, in order to reduce the amount of data being processed. As the skilled person will appreciate, the virtual view generated is not required to show the entirety of the 3D model, but only a part of the 3D model may be rendered to be presented as a 2D image/video on the display. All objects within the working range are tracked, and if any additional objects enter or existing objects move within the working range, the 3D model is modified, as can be seen in S204.

The assembled, modified or destroyed (at least partially) 3D model is stored to database at S205, so that the 3D model can be accessed by the view generation unit 102.

The steps are then repeated, where based on newly received vehicle surrounding environment data, the positions of the vehicle and the objects within the 3D model are updated.

The view generation unit 102 collects the 3D model from the database at S211. As will be appreciated by the skilled reader, the 3D model may be stored and transferred to the GPU in the same form, or be stored in a simpler form in the database. For example, the 3D may be converted in a different format to be processed by the GPU. The collected 3D model geometry data are sent to the GPU of the view generation unit 102 (S212). Then, in S213, image/video data from local vehicle cameras are received by the view generation unit 102. In other embodiments, the view generation unit 102 may further include a step of collecting image/video data from an external source via the wireless communication unit. The GPU of the view generation unit 102 then attaches the live image data to 3D model geometry in S214. Finally, at S215, any historic image data from the historical data storage 107 are attached to the 3D model geometry in the GPU where no live image data are available. Once S215 is completed, the relevant portion of the 3D model having the image data attached is rendered to be presented as a virtual surround view at the display. S211-S215 are repeated such that the view generation unit updates the virtual surround view displayed using any new image data and to address any updates made to the 3D model.

Figure 4A:
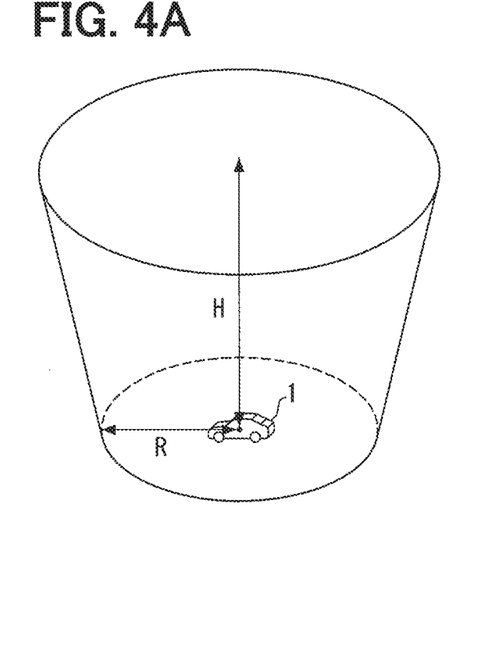
FIG. 4A illustrates an example of a range area.
Figure 4B:
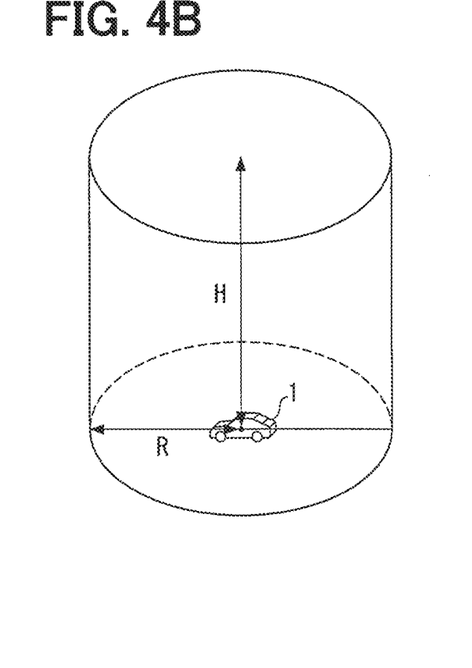
FIG. 4B illustrates another example of a range area.

FIG. 4A and FIG. 4B illustrate examples of a range area (working area). A frustoconical range area (in FIG. 4A) and a cylinder shaped range area (in FIG. 4B) are shown as examples. Other shapes are also possible, such as a cube or a pyramid shaped range area. The dot in the middle of the vehicle model represents the centre of the vehicle. The range distance is defined as the radius of the base of the range area.

Figure 5:
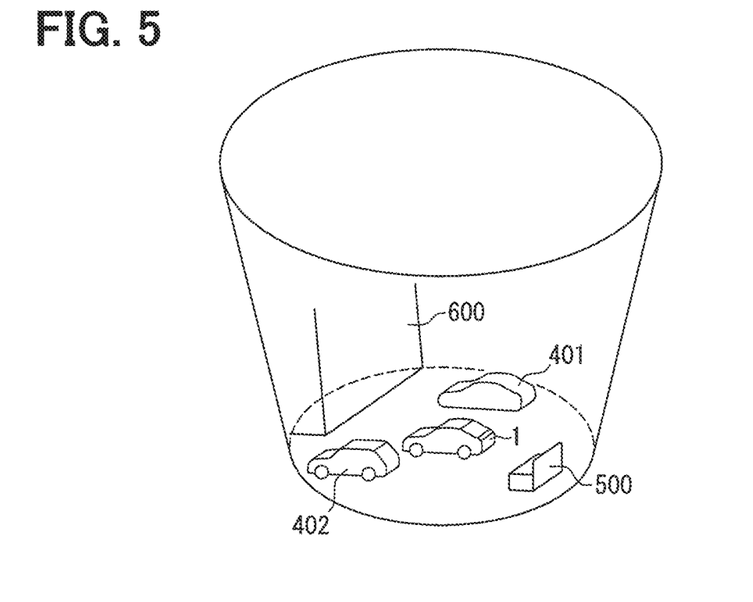
FIG. 5 illustrates an example of local 3D objects generated in a range area.

FIG. 5 illustrates an example of local 3D objects generated in a working range area. The vehicle 1 is represented in the centre of the range area, where the vehicle is sufficiently distanced from the walls of the range area. A structural object 600 (which for example is a part of a building), other vehicles 401, 402, and another object 500 are formed in the 3D model. The vehicle 1 has data relating to its own vehicle type and exterior. Another vehicle 402 may have also sent, via Vehicle to Vehicle communication (V2V), the data relating to its vehicle type, exterior, position and orientation, and based on this a representation of the vehicle 402 can be formed very easily. Another vehicle 401 and object 500 are represented in simpler forms. Both the vehicle 401 and the object 500 are based on a cuboid shape, but it can be seen that the shape of the upper portions of vehicle 401 and the object 500 are formed to more closely match the original shapes of the vehicle and the object in real life. Thus, in some examples, at least some objects may be represented as intermediate shapes between a detailed textured model and a cuboid having rounded edges. It can be seen that such intermediate shape can significantly improve recognition of the object. For example, the object 500 can be recognised as being a bench, even though the legs of the bench are not represented in a detailed manner. However, when such intermediate mould shapes are used, objects can be represented using much less data without losing too much detail and significantly reducing any distortion once the images are attached to the objects.

Figure 6:
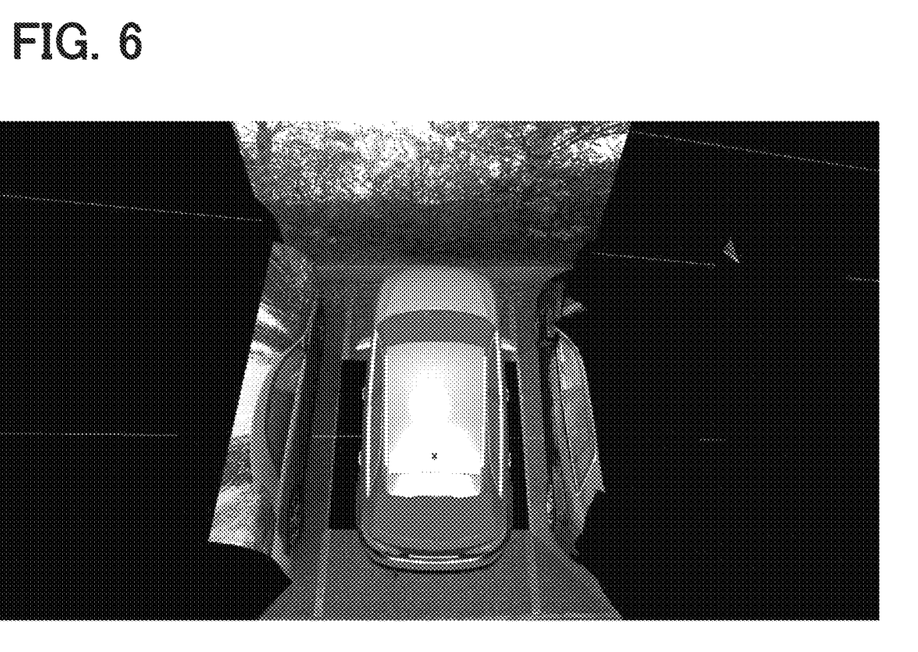
FIG. 6 is an example top view of a vehicle.
Figure 8:
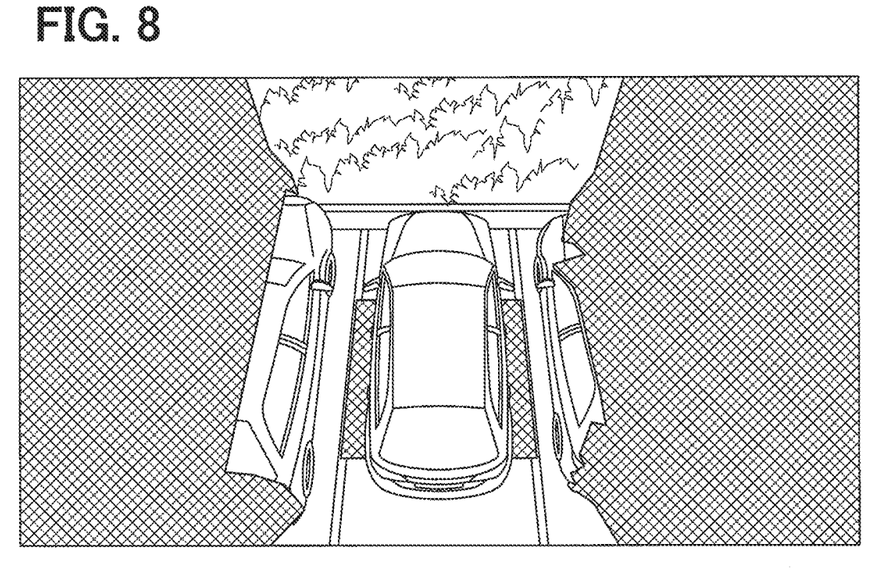
FIG. 8 is a drawing corresponding to FIG. 6.

FIG. 6 and FIG. 8 illustrate an example top surround view of the vehicle generated by the surround view system 100.

In this example, the surround view system 100 is being used during slow speed parking manoeuvre to assist a driver in this activity. The vehicle may also be driven autonomously and the driver may simply be monitoring the automated system.

The re-created top surround view of FIG. 6 and FIG. 8 is created from the usual surround monitoring cameras positions around the vehicle. Here, the vehicle in the centre is the vehicle comprising the surround view system 100. In the environment of the vehicle in question, there are two vehicles, one at each side of the vehicle. It can be seen that the representation of each vehicle differ slightly. The difference is in the rendering mechanism used for creating the representation of each vehicle.

The vehicle on the left side is represented by a rounded edge box, which is one of the simplest forms of 3D model of an object. It can be seen that a side view image of the vehicle on the left side has been attached to the simple rounded edge box 3D model of the left vehicle. The vehicle on the right side is an ideal texture model of the vehicle that it parked, and the corresponding video is also overlaid onto the textured model. The left vehicle demonstrates a representation that can be achieved just by using image/video data and measured geometry. In other words, a separation of measured geometry and image/video can still provide a virtual view which represents reality in a sufficient manner to indicate to the user where the surrounding objects are. Thus, such 3D models can be created regardless of whether only low or high resolution sensors are used. By combining data of liver or historical images/videos from as many sources as possible, including both internal and external sources, the virtual surround view which is a representation that reflects reality is provided.

Although the textured model provides a more detailed representation, FIG. 6 and FIG. 8 nevertheless illustrate that even the simplest form of 3D model with the corresponding image attached to it provides a very good indication to the driver where the parked vehicles are in relation to the driver's own vehicle.

Figure 7:
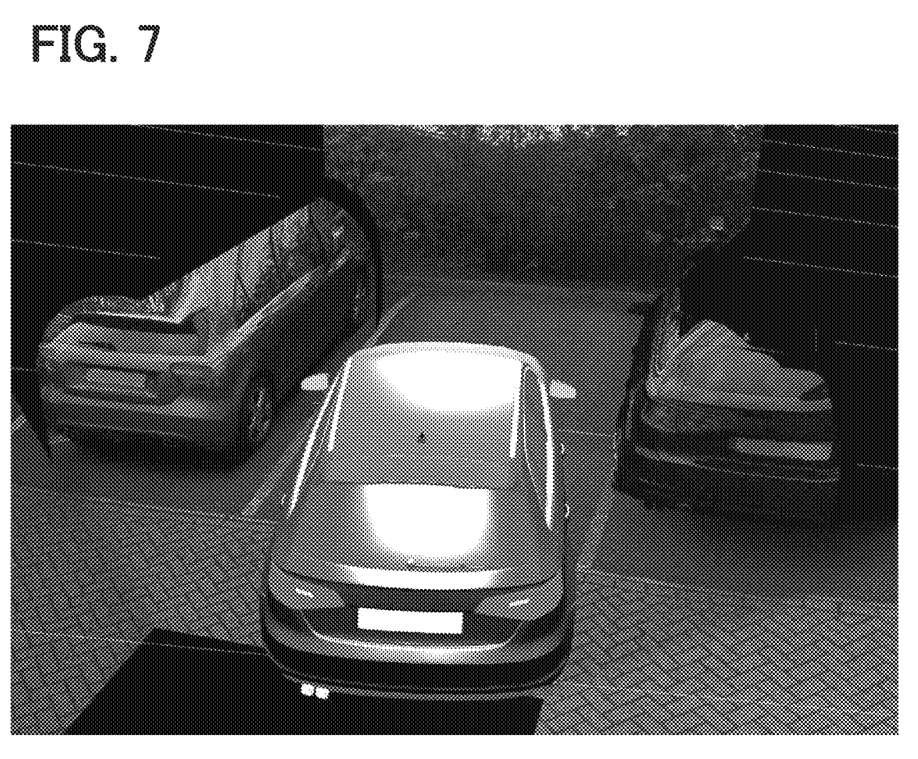
FIG. 7 is another example top view of a vehicle.
Figure 9:
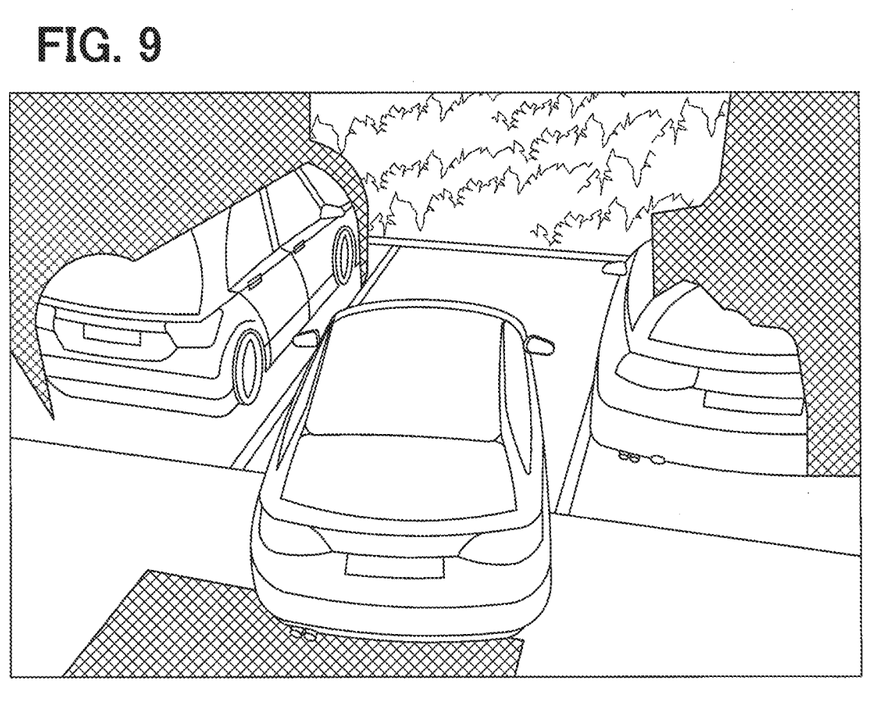
FIG. 9 is a drawing corresponding to FIG. 7.

FIG. 7 and FIG. 9 illustrate another example top view of the vehicle generated by the surround view system 100.

In this view, all objects are created as textured model. This process can be made particularly efficient where information from other vehicles is received via the wireless communication unit 108 implementing V2X communication.

As an example implementation situation, here is described a situation in which a vehicle in an automated parking mode. The driver of the vehicle places the vehicle in an automated parking mode upon entry to a car park. The engagement of the vehicle into the automated parking mode is detected by the surround motion system, and the surround motion system begins the process of generating a virtual surround view. In other embodiments, the surround motion system may be configured to receive an input from the driver instead of detecting that the vehicle has been placed in an automated parking mode. For example, the user may switch on the surround view system. The driver is provided with the virtual surround view on a display, and is then able to monitor the vehicle being autonomously driven and parked in the car park. If the driver wishes, the driver may override the automated parking mode and intervene at any point.

The driver may further interact with the user interface to move the virtual camera position and modify the view point of the virtual surround view displayed on the display. For example, the user may move the virtual camera to 3-4 metres above and behind the vehicle.

The vehicle first uses its in-built radar and ultrasonic sensors to identify objects within a predetermined surrounding area having a predetermined range surrounding the vehicle. For example, the predetermined range may be 10 meters surrounding the vehicle, where the area may be defined by a cylindrical shape or a frustoconical shape. That is to say, any objects that are within a cylinder or a frustum of a cone having a radius of 10 meters with the vehicle placed at the centre of the base of the cylinder or the frustum of a cone are considered as surrounding environment, and data relating to such objects are obtained as environment data. The environment data relating to these objects are passed to the three-dimensional geometry unit which builds a rough local three-dimensional scene from the ego motion data of the vehicle and the sensor inputs.

In addition to the rough local three-dimensional scene, the V2X communication system is used to access the car park database which stores a 3D model of the structure of the car park. Such 3D model may be provided by the car park. The vehicle may store the 3D model in the data storage unit such that the 3D model becomes a part of stored historical data to be used at a later date if the vehicle returns to the same car park.

Other vehicles in the car park may have their V2X (and V2V) systems running and via V2V the vehicle may be able to obtain directly from other vehicles the vehicle classification code and their current parking position to the system.

Using the 3D model provided by the car park and the vehicle parking details received, a more detailed three-dimensional model of the surrounding scene of the vehicle can be formed. In particular, by receiving a 3D model or information from other vehicles, it is possible to obtain information about any objects within the predetermined range that may be behind another object such that the vehicle's local sensors and radars would not have been able to sense or observe such objects. Thus, a more informed virtual view can be provided.

Once the 3D geometry unit has assembled a local 3D model, the predetermined range can be adjusted to a wider working area. For example, if the predetermined working range has a cylinder shape, the cylinder wall can be pushed out to 20 meters.

The normal working range of current surround view systems may be less than 10 meters, nominally 5 meters. Where multiple objects are tracked within a "working area" (range area) then the wall (e.g. wall of the frustum of a cone or the cylinder) are set to be a sufficient distance away from the centre of the vehicle. For example, distances of up to 20 meters allows more objects to be visible within this area.

The view generation unit attaches the relevant visual data received to portions of the 3D model. For example, the relevant visual data are received from the vehicle's own cameras, cameras of the other vehicles, and live Wi-Fi stream from the car park's overhead CCTV system. Once the relevant visual data are attached to the 3D model, the visual generation unit produces 3D rendered image of the 3D model to be shown on the display.

In some cases historic images taken by the vehicle's camera could also be used as a part of the visual data received.

In cases where historic data are used, colourisation of images could be used to demonstrate which portions of the image were rendered using historic data (which does mean lower confidence, as it is not the newest data). For example, the portions provided using the historic images may be added with a red colourised tone.

By providing a wider view (using data from external sources) than the view available using only own data, the driver is provided with more information to determine whether they would like to intervene, as well as more time in which they may wish to intervene.

For example, if the user finds that there is a structure that could be physically very close to the vehicle and this structure is colourised as being represented using historic data, the driver may be more inclined to intervene the autonomous driving or check in reality to confirm. On the other hand, if the structure is colourised as being represented using live data, the driver can have higher confidence that what is being shown is an accurate representation of the reality.

As the vehicle moves, the 3D geometry unit and the view generation unit continue to update the surround image in accordance with the vehicle movement.

As discussed briefly in the background section, known methods require high resolution cameras and texturing steps for projecting onto a surface having a predetermined shape. This requires high resolution cameras and sensors and even with such high resolution significant distortion is introduced due to the projection onto a surface having a predetermined shape.

On the contrary, the present disclosure provides an image with minimal distortion in an efficient manner, where the resolution of the cameras and sensors do not affect the quality of the final virtual view as much as the known methods and apparatus.

Further, using local image capturing and sensing in combination with external image and geometry sensing, as well as historical data of 3D motion of objects and visual data, it is possible to obtain a wider virtual surround view than when only using local image capturing and sensing. In fact, a more detailed and accurate view can be obtained, whilst not requiring high quality local image capturing and/or sensing devices.

Accordingly, it will be appreciated that there have been described a number of approaches to providing improved visual functions of surround motion system.

As will also be appreciated, various modifications and alternatives are possible while retaining the overall approach of the present teachings.

The presently described approaches can be implemented on a programmable computer. In order to provide the functionality to a programmable computer a computer program product may be provided which can be provided or transmitted to the computer to deliver code that enables the computer to implement the functionality. The product may be distributed and/or stored by way of a physical medium such as a computer-readable disc or portable memory device, which may collectively be termed a non-transitory computer readable medium. The product may also or alternatively be distributed and/or stored by way of a transient medium such as a transmission channel, communication signal or other propagating waveform, which may collectively be termed a transient computer-readable medium.

Although the embodiments above have been described in considerable detail, numerous variations and modifications will become apparent to those skilled in the art once the above disclosure is fully appreciated.

Incidentally, the phrase "unit" may be referred to as a device, portion, and section. The 3D geometry unit may be configured from an MPU (micro processing unit), a CPU (central processing unit), a GPU (graphics processing unit), other ASIC (application specific processor), or the like. In addition, a part or all of the functions executed by the 3D geometry unit may be configured in hardware with one or more ICs or the like. The view generation unit may be configured from an MPU (micro processing unit), a CPU (central processing unit), a GPU (graphics processing unit), other ASIC (application specific processor), or the like. In addition, a part or all of the functions executed by the view generation unit may be configured in hardware with one or more ICs or the like.

The vehicle sensor 103 may correspond to a local vehicle sensor, the vehicle camera 104 may correspond to a local vehicle camera, the display output 106 may correspond to a display, and the user input interface 105 may correspond to a user interface.

It is noted that a flowchart or the processing of the flowchart in the present application includes multiple steps (also referred to as sections), each of which is represented, for instance, as S200. Further, each step can be divided into several sub-steps while several steps can be combined into a single step.

Controllers and methods described in the present disclosure may be implemented by a special purpose computer created by configuring a memory and a processor programmed to execute one or more particular functions embodied in computer programs. Alternatively, the control units, the controllers and the methods described in the present disclosure may be implemented by a special purpose computer created by configuring a processor provided by one or more special purpose hardware logic circuits. Further alternatively, the control units, the controllers and the methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

While various embodiments, configurations, and aspects of a surround monitoring system for vehicles according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

The terminology used herein is for the purpose of describing particular example embodiments only, and is not intended to be limiting. As used herein, the singular forms "a," "an," and "the" may be intended to include the plural forms as well, unless the context clearly indicates otherwise. The terms "comprises," "comprising," "including," and "having," are inclusive and, therefore, specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers, and/or sections, these elements, components, regions, layers, and/or sections should not be limited by these terms. These terms may be only used to distinguish one element, component, region, layer, or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A surround view system for a vehicle comprising:
   a three-dimensional geometry unit configured to receive vehicle surrounding environment data and generate a three-dimensional model of a vehicle surrounding environment based on the received vehicle surrounding environment data, the three-dimensional model of the vehicle surrounding environment comprising objects within a working area within which the objects are represented as cuboid models; and
   a view generation unit configured to receive visual data and map the visual data to portions of the three-dimensional model based on spatial and/or temporal information of the visual data and the vehicle surrounding environment data to form a virtual surround view, wherein
   the view generation unit is configured to form the virtual surround view by:
      attaching live image data to a cuboid model of an object within the vehicle surrounding environment; and
      attaching historic image data to the cuboid model of the object in response to the live image data not being available.

2. The surround view system according to claim 1, comprising a wireless communication unit configured to implement vehicle-to-everything communication.

3. The surround view system according to claim 2, wherein the three-dimensional geometry unit is configured to receive at least some vehicle surrounding environment data from an external source via the wireless communication unit.

4. The surround view system according to claim 2, wherein the view generation unit is configured to receive at least some visual data from an external source via the wireless communication unit.

5. The surround view system according to claim 1, wherein the three-dimensional geometry unit is configured to receive at least some vehicle surrounding environment data from a local vehicle sensor.

6. The surround view system according to claim 1, wherein the view generation unit is configured to receive at least some visual data from a local vehicle camera.

7. The surround view system according to claim 1, wherein the vehicle surrounding environment data comprises data relating to an object within a predetermined range from the vehicle, the data comprising at least one of: positional data of the object; texture of the object; or ego-motion data of the vehicle.

8. The surround view system according to claim 1, wherein the view generation unit is configured to map an image by projecting texture detected in the visual data.

9. The surround view system according to claim 1, comprising a data storage unit configured to store historical data including at least one of previously used: three-dimensional motion data, three-dimensional model or visual data.

10. The surround view system according to claim 1 comprising a display unit configured to display the virtual surround view.

11. The surround view system according to claim 1, comprising a user interface configured to adjust a view point of the virtual surround view displayed on a display unit.

12. The surround view system according to claim 1, wherein the three-dimensional geometry unit and the view generation unit are respectively configured to receive vehicle surrounding environment data and visual data relating to objects within a predetermined range.

13. The surround view system according to claim 12, wherein an increased range is applied if no vehicle surrounding environment data are obtained in the predetermined range.

14. The surround view system according to claim 9, wherein the view generation unit is configured to select historical visual data based on a perspective view of the historic image data.

15. The surround view system according to claim 1, wherein the view generation unit is configured to adjust colourisation of areas of the virtual surround view based on temporal data of the visual data mapped onto the areas.

16. A vehicle comprising a surround view system according to claim 1.

17. A method of generating a surround view for a vehicle, the method comprising:
receiving vehicle surrounding environment data;
generating a three-dimensional model of a vehicle surrounding environment based on the received vehicle surrounding environment data, the three-dimensional model of the vehicle surrounding environment comprising objects within a working area within which the objects are represented as cuboid models;
receiving visual data; and
mapping the visual data to portions of the three-dimensional model based on spatial and/or temporal information of the visual data and the vehicle surrounding environment data to form a virtual surround view, wherein
the virtual surround view is formed by:
attaching live image data to a cuboid model of an object within the vehicle surrounding environment; and
attaching historic image data to the cuboid model of the object in response to the live image data not being available.

18. The method according to claim 17, wherein vehicle surrounding environment data are receivable from at least one of an external source via a wireless communication and a local vehicle sensor.

19. The method according to claim 17, wherein visual data are receivable from at least one of an external source via a wireless communication or a local vehicle camera.

20. The method according to claim 17, further comprising displaying the virtual surround view on a display.

21. The method according to claim 17, further comprising assembling, modifying or destroying at least a portion of the three-dimensional model based on additional vehicle surrounding environment data received.

22. The method according to claim 17, wherein vehicle surrounding environment data and visual data relating to objects within a predetermined range are received.

23. The method according to claim 17, comprising a further step of storing used data in a data storage as historical data for later use.

24. The method according to claim 23, wherein historical data of the data storage are cleared based on frequency of repeated use of the historical data, and/or whether positional data of the historical data falls within a current range.

25. A computer program product stored in a non-transitory tangible storage medium and comprising processor-executable instructions for causing a programmable computer to perform the method according to claim 17.

26. The surround view system according to claim 1, wherein
each object in the three-dimensional model has its own vertex model.

* * * * *